(12) United States Patent
Wu et al.

(10) Patent No.: US 10,926,892 B1
(45) Date of Patent: Feb. 23, 2021

(54) ON-ORBIT PROPELLANT METERING AND REFUELING

(71) Applicant: Space Systems/Loral, LLC, Palo Alto, CA (US)

(72) Inventors: Gordon Wu, Sunnyvale, CA (US); David Marlow, Redwood City, CA (US); Jeff Aaron Baldwin, Sunnyvale, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 650 days.

(21) Appl. No.: 15/809,856

(22) Filed: Nov. 10, 2017

(51) Int. Cl.
*B64G 1/40* (2006.01)
*B64G 1/10* (2006.01)
*B64G 1/64* (2006.01)
*B64G 1/24* (2006.01)

(52) U.S. Cl.
CPC ............ *B64G 1/402* (2013.01); *B64G 1/1078* (2013.01); *B64G 1/242* (2013.01); *B64G 1/401* (2013.01); *B64G 1/646* (2013.01)

(58) Field of Classification Search
CPC .................................................... B64G 1/402
See application file for complete search history.

(56) References Cited

U.S. PATENT DOCUMENTS

| | | | |
|---|---|---|---|
| 6,286,304 B1 | 9/2001 | Back et al. | |
| 8,899,527 B2 | 12/2014 | Allen et al. | |
| 9,714,777 B1 | 7/2017 | Wu | |
| 2013/0119204 A1* | 5/2013 | Allen | B64G 1/402 244/172.5 |
| 2016/0039544 A1 | 2/2016 | Roberts et al. | |
| 2017/0159647 A1 | 6/2017 | Vial et al. | |

FOREIGN PATENT DOCUMENTS

| | | |
|---|---|---|
| CN | 105065898 A | 11/2015 |
| WO | WO 2008/066512 A2 | 6/2008 |

* cited by examiner

*Primary Examiner* — Justin M Benedik
(74) *Attorney, Agent, or Firm* — Weaver Austin Villeneuve & Sampson LLP

(57) ABSTRACT

A first spacecraft includes a first fluid storage arrangement and a fluid flow metering arrangement including a holding tank coupled with the first fluid storage arrangement, a flow meter disposed proximate to the holding tank, and an active thermal control arrangement controlling the temperature of the flow meter and the holding tank. The first spacecraft is configured to service a second spacecraft, the second spacecraft including a second fluid storage arrangement, by transferring one or both of a propellant and a pressurant from the first fluid storage arrangement to the holding tank, and from the holding tank, through the flow meter, to the second fluid storage arrangement.

20 Claims, 9 Drawing Sheets

ON-ORBIT PROPELLANT METERING AND REFUELING

TECHNICAL FIELD

This invention relates generally to a spacecraft propulsion system, and, more particularly, to techniques for on-orbit propellant metering and refueling.

BACKGROUND

The assignee of the present invention manufactures and deploys spacecraft for, inter alia, communications and broadcast services.

Such spacecraft are equipped with on board propulsion systems, including chemical or electric thrusters, for orbit raising from a launch vehicle transfer orbit (or "parking orbit") to an operational orbit, for example, to a geosynchronous orbit; for stationkeeping once disposed in the operational orbit; and for attitude control/momentum management purposes.

Spacecraft thrusters may be broadly categorized as either "chemical" or "electric" based on the respective primary energy source. Chemical thrusters suitable for spacecraft propulsion systems accelerate combustion or decomposition products of liquid propellants such as hydrazine and nitrogen tetroxide. A chemical spacecraft propulsion system may include one or more pressure vessels for storage of a gas pressurant, such as helium, at high pressures. Electric thrusters use spacecraft power to ionize high atomic number inert gases such as xenon or krypton and accelerate the resulting ions.

The present disclosure includes techniques for on-orbit resupply of fluid (i.e., liquid or gas) propellant and pressurant from a first spacecraft (the servicing spacecraft) to a second spacecraft (the client spacecraft). Some related techniques are disclosed in U.S. Pat. No. 8,899,527, entitled "Propellant Transfer System and Method for Resupply of Propellant to On-Orbit Spacecraft", assigned to an affiliate of the assignee of the present disclosure. More particularly, the presently disclosed techniques are directed toward improving the measurement accuracy of on-orbit fluid transfer which, in the absence of the presently disclosed techniques, is generally no better than about +/−2%.

SUMMARY

According to some implementations, a system includes a first spacecraft including a first fluid storage arrangement and a fluid flow metering arrangement that includes a holding tank coupled with the first fluid storage arrangement, a flow meter disposed proximate to the holding tank, and an active thermal control arrangement controlling, within a specified range, temperature of the flow meter and the holding tank. The first spacecraft is configured to service a second spacecraft, the second spacecraft including a second fluid storage arrangement, by transferring one or both of a propellant and a pressurant from the first fluid storage arrangement to the holding tank, and from the holding tank, through the flow meter, to the second fluid storage arrangement.

In some examples, the first fluid storage arrangement may include at least one liquid propellant tank and at least one pressurant tank and the holding tank may be selectably coupled with one or both of the liquid propellant tank and the pressurant tank.

In some examples, the active thermal control arrangement may include an isothermal mounting panel, one or more heat pipes and a thermostatically controlled heater.

In some examples, the first spacecraft may include a pressurant tank and a plurality of regulator modules are disposed in parallel between the pressurant tank and the holding tank, each regulator module including a pressure regulator and a control valve. In some examples, the regulator modules may be configured to deliver pressurant from the pressurant tank to the holding tank at a selectable regulated pressure. In some examples, the plurality of regulator modules may include one or both of an analog pressure regulator and a Bang-Bang pressure regulator.

In some examples, a measurement error of the flow meter, when temperature controlled within the specified range, may be than or equal to 1%.

In some examples, the active thermal control arrangement may include one or more thermoelectric coolers.

In some examples, the first spacecraft may be configured to be serviced by a third spacecraft, the third spacecraft including a third fluid storage arrangement, by transferring one or both of a propellant and a pressurant from the third fluid storage arrangement to the holding tank, and from the holding tank, through the flow meter, to the first fluid storage arrangement.

According to some implementations, a method includes operating a first orbiting spacecraft, the first spacecraft including a first fluid storage arrangement, a flow meter, a holding tank disposed proximate to the flow meter and an active thermal control arrangement, controlling a temperature of the flow meter and the holding tank within a specified range, and transferring one or both of a propellant and a pressurant from the holding tank, through the flow meter, to a second fluid storage arrangement.

In some examples, the first fluid storage arrangement may include at least one liquid propellant tank and at least one pressurant tank and the holding tank may be selectably coupled with one or both of the liquid propellant tank and the pressurant tank.

In some examples, the active thermal control arrangement may include an isothermal mounting panel, one or more heat pipes and a thermostatically controlled heater.

In some examples, a measurement error of the flow meter, when temperature controlled within the specified range may be less than or equal to 1%.

In some examples, the method may further include servicing a second orbiting spacecraft, the second spacecraft including the second fluid storage arrangement. In some examples, the method may yet further include receiving service from a third orbiting spacecraft, the third spacecraft including a third fluid storage arrangement, the service including transferring one or both of a propellant and a pressurant from the third fluid storage arrangement to the holding tank, and from the holding tank, through the flow meter, to the first fluid storage arrangement.

According to some implementations, a method includes operating a first orbiting spacecraft, the first spacecraft including a first fluid storage arrangement, a flow meter, a holding tank disposed proximate to the flow meter and an active thermal control arrangement, controlling, with the active thermal control arrangement, a temperature of the flow meter and the holding tank within a specified range, and servicing a second orbiting spacecraft, the second spacecraft including a second fluid storage arrangement, by transferring one or both of a propellant and a pressurant from the holding tank, through the flow meter, to the second fluid storage arrangement.

In some examples, the first fluid storage arrangement may include at least one liquid propellant tank and at least one pressurant tank and the holding tank may be selectably coupled with one or both of the liquid propellant tank and the pressurant tank.

In some examples, the active thermal control arrangement may include an isothermal mounting panel, one or more heat pipes and a thermostatically controlled heater.

In some examples, the method may further include receiving service from a third orbiting spacecraft, the third spacecraft including a third fluid storage arrangement, the service including transferring one or both of a propellant and a pressurant from the third fluid storage arrangement to the holding tank, and from the holding tank, through the flow meter, to the first fluid storage arrangement.

In some examples, a plurality of regulator modules and control valves are disposed in parallel between the first fluid storage arrangement and the holding tank, the regulator modules and control valves configured to deliver pressurant at a selectable regulated pressure.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The presently disclosed techniques contemplate a fluid dispensing and metering system that provides high measurement accuracy (+/−1%). The improved measurement accuracy mitigates problems associated with over- or under-supply of propellant from a servicing spacecraft vehicle to a client spacecraft.

In some implementations, an active thermal control arrangement maintains a holding tank a flow meter disposed proximate to the holding tank within a narrow temperature range, thereby improving the accuracy of the flow meter. The flow meter may be an ultrasonic flow meter, for example.

Figure 1:
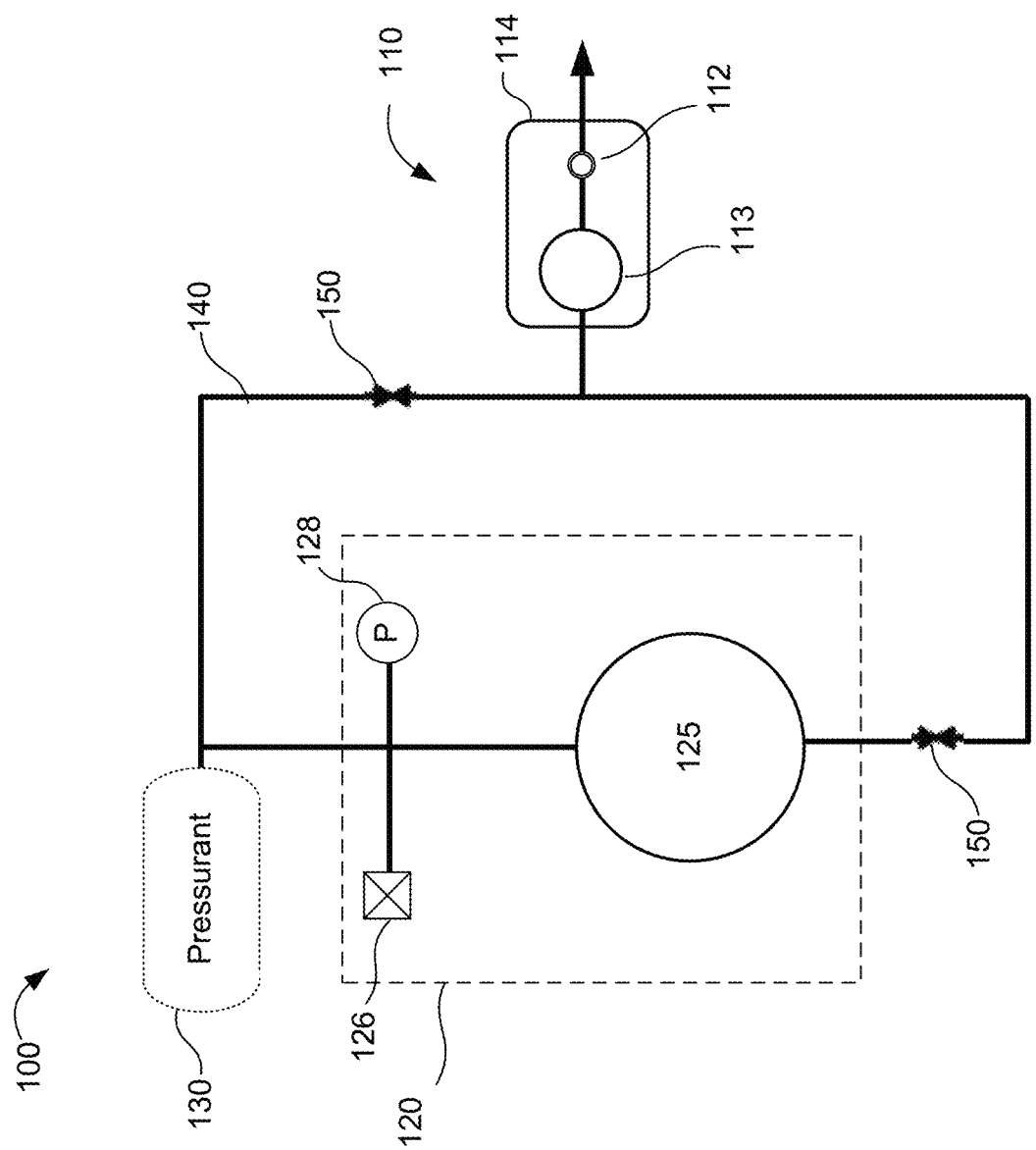
FIG. 1 illustrates a simplified block diagram of a spacecraft, according to an implementation.

FIG. 1 illustrates a simplified block diagram of a spacecraft, according to an implementation. The spacecraft 100 includes a fluid flow metering arrangement 110 and a first fluid storage arrangement 120. The flow metering arrangement 110 includes a holding tank 113 coupled with the first fluid storage arrangement 120, a flow meter 112 disposed proximate to the holding tank 113, and an active thermal control arrangement 114 configured to control the temperature of the holding tank 121 and the flow meter 123. The spacecraft 100 may be configured to service a second spacecraft (not illustrated). The second spacecraft may include a second fluid storage arrangement, and servicing the second spacecraft may include transferring one or both of a propellant and a pressurant from the fluid storage arrangement 120 to the holding tank 113, and from the holding tank 113, through the flow meter 112, to the second fluid storage arrangement.

In the illustrated implementation, the fluid storage arrangement 120 includes a propellant tank 125 a service (fill/drain) valve 126 and a pressure transducer 128. Although a single propellant tank 125 is illustrated, it will be appreciated that the present disclosure contemplates that the first storage arrangement 120 may include any number of propellant tanks 125. In some implementations, the propellant tank 125 may be configured to store liquid propellant such as, for example, hydrazine, monomethyl hydrazine, or nitrogen tetroxide. In such implementations, the spacecraft 100 may include a pressurant tank 130. In other implementations the propellant tank 125 may be configured to store propellant such as xenon or argon or krypton, for example, in a gaseous or supercritical state. In such implementations, the pressurant tank 130 may be omitted.

The fluid storage arrangement 120 and/or the pressurant tank 130 may be coupled with the flow metering arrangement 110 by way of one or more propellant and/or pressurant lines 140. Commandable valves, for example latch valves, 150 may selectably permit or prevent fluid flow to the flow metering arrangement 110 one or both of the propellant tank 125 and the pressurant tank 130.

As will be described in more detail hereinbelow, the active thermal control arrangement 114 may include an isothermal mounting panel (not illustrated), one or more heat pipes (not illustrated) and a thermostatically controlled heater (not illustrated), in some implementations.

Figure 2:
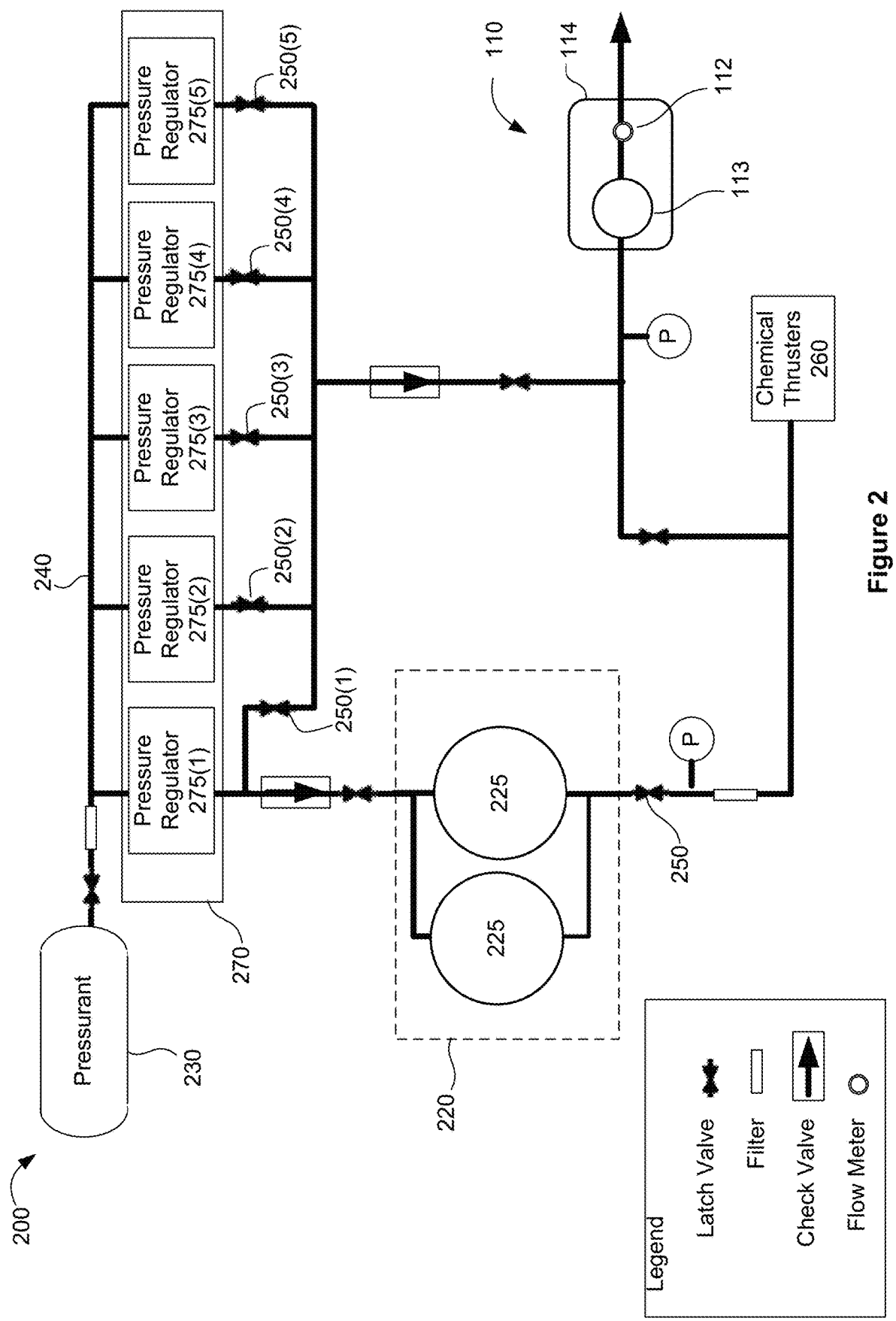
FIG. 2 illustrates a simplified block diagram of a spacecraft, according to another implementation.

FIG. 2 illustrates a simplified block diagram of a spacecraft, according to another implementation. The spacecraft 200 includes the fluid flow metering arrangement 110 and a first fluid storage arrangement 220. The flow metering arrangement 110 includes the holding tank 113 coupled with the first fluid storage arrangement 220, a flow meter 112 disposed proximate to the holding tank 113, and an active thermal control arrangement 114 configured to control the temperature of the holding tank 121 and the flow meter 123. The spacecraft 200 may be configured to service a second spacecraft (not illustrated). The second spacecraft may include a second fluid storage arrangement, and servicing the second spacecraft may include transferring one or both of a propellant and a pressurant from the fluid storage arrangement 220 to the holding tank 113, and from the holding tank 113, through the flow meter 112, to the second fluid storage arrangement.

In the illustrated implementation, the fluid storage arrangement 220 includes two propellant tanks 225. In the illustrated implementation, the spacecraft 200 includes a pressurant tank 230 and the propellant tanks 225 are configured to store liquid propellant such as, for example, hydrazine, monomethyl hydrazine, or nitrogen tetroxide that may be used by chemical thrusters 260 and/or may be supplied to holding tank 113. In some implementations, the capacity of holding tanks 225 may be several times greater than the capacity of holding tank 113. In an implementation, for example, the holding tanks 225 may have an aggregate capacity of more than 1000 liters, whereas the capacity of holding tank 113 may be on the order of 50 liters.

In the illustrated implementation, a pressure regulation system 270 is disposed between the pressurant tank 230 and the holding tank 113. The pressure regulation system 270 may include a plurality of pressure regulator modules 275 disposed in parallel between the pressurant tank 230 and the holding tank 113. Each pressure regulator module may be configured to deliver pressurant at a different regulated pressure. For example, pressure regulator 270(1) may be configured to deliver pressurant at a regulated pressure of 300 psia, pressure regulator 270(2) may be configured to deliver pressurant at a regulated pressure of 250 psia, pressure regulator 270(3) may be configured to deliver pressurant at a regulated pressure of 200 psia, pressure regulator 270(4) may be configured to deliver pressurant at a regulated pressure of 350 psia, and pressure regulator 270(5) may be configured to deliver pressurant at a regulated pressure of 400 psia. By appropriately controlling latch valves 250(1), 250(2), 250(3), 250(4), and 250(5), a desired regulated pressure of the holding tank 113 may be obtained. Alternatively, or in addition, a selectable regulated pressure of the holding tank 113 may be obtained by using a "Bang-Bang" pressure regulation scheme such as described, for example, in U.S. Pat. No. 5,954,089, entitled "Electromagnetic regulator utilizing alternate valve operating modes for gas pressure regulation".

Figure 3:
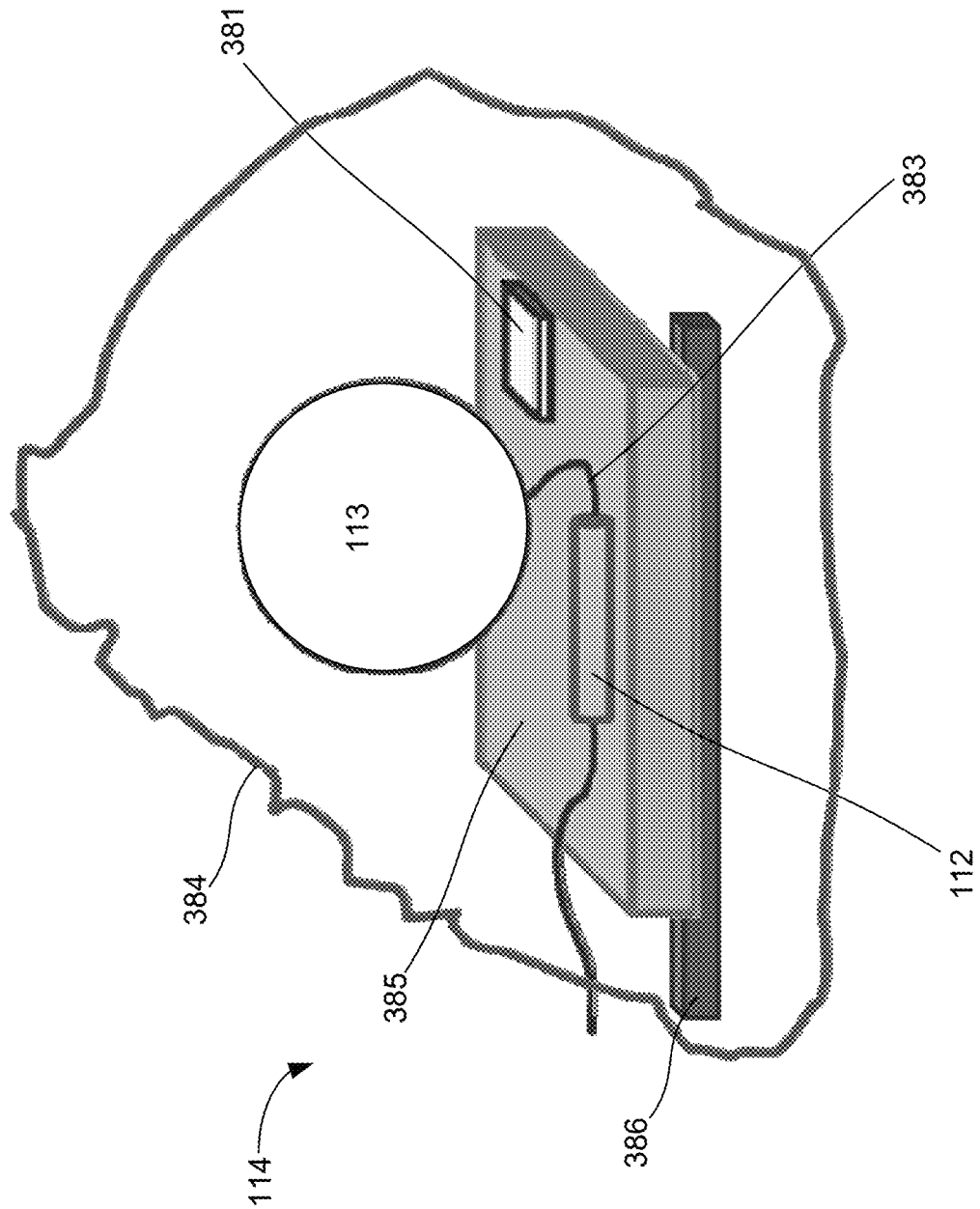
FIG. 3 illustrates features of the active thermal control arrangement, according to an implementation.

FIG. 3 illustrates features of the active thermal control arrangement 114, according to an implementation. In the illustrated implementation, the flow meter 112 and the holding tank 113 are enclosed together by a thermal insulation arrangement 384. The thermal insulation arrangement 384 may be or include a multi-layer insulation (MLI) blanket, for example. The flow meter 112 and the holding tank 113 may be thermally coupled with a mounting plate 385. Advantageously, the flow meter 112 and the holding tank 113 are disposed close together, coupled with a short length of propellant line 383. The mounting plate 385 may be generally isothermal, and be thermally coupled with one or more heat pipes 386. A heater 381 that may be thermostatically controlled may provide active temperature control of the mounting plate 385, the flow meter 112 and the holding tank 113.

It will be appreciated that the illustrated arrangement can be configured to control temperatures of the flow meter 112 and the holding tank 112 to an approximately identical value within a tight tolerance. As a result, measurement error of the flow meter 112 may be substantially reduced, particularly in implementations in which the flow meter is an ultrasonic flow meter.

Figure 4:
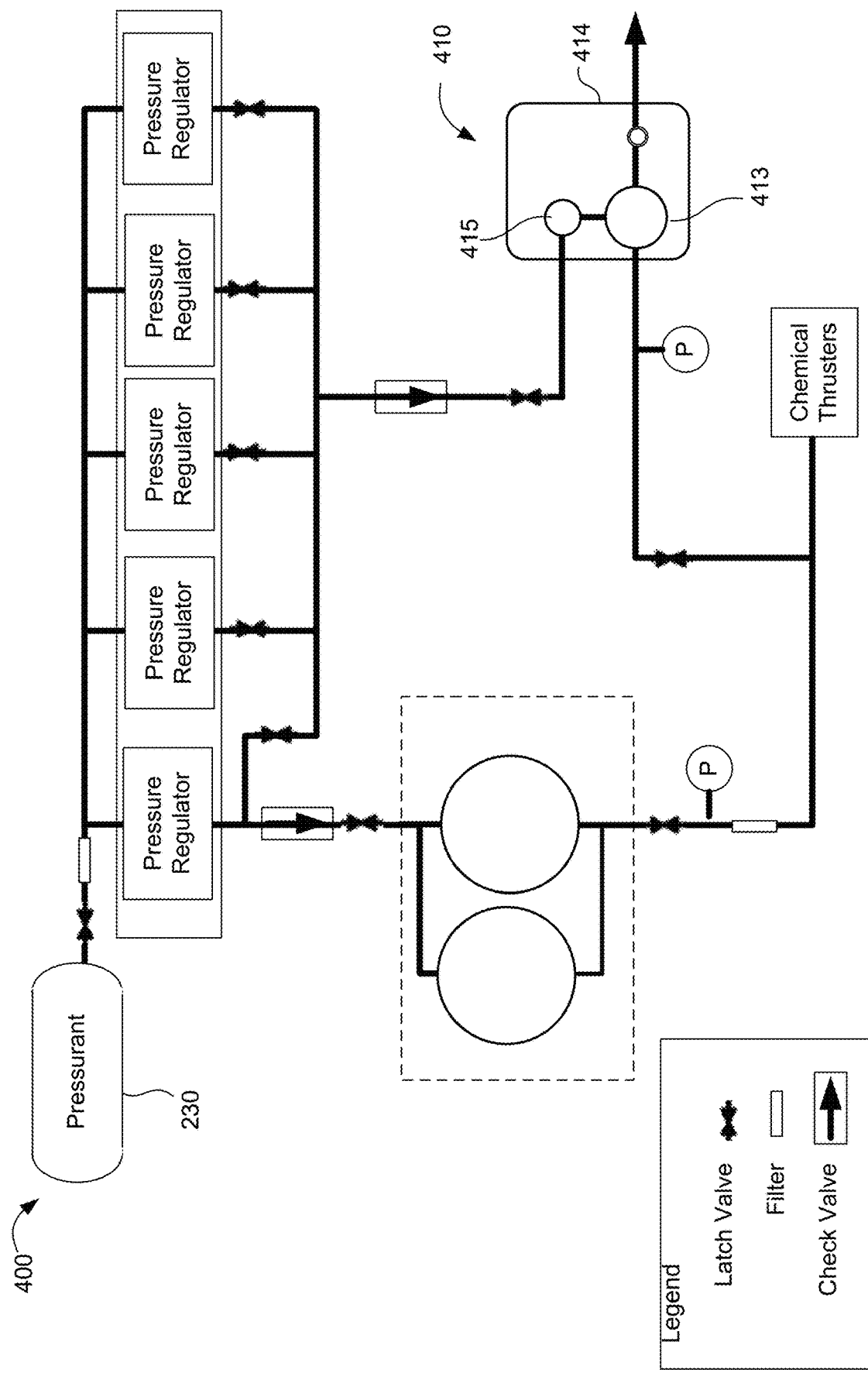
FIG. 4 illustrates a simplified block diagram of a spacecraft, according to another implementation.

As described above in connection with FIG. 2, a liquid propellant such as, for example, hydrazine, monomethyl hydrazine, or nitrogen tetroxide may be supplied to holding tank 113, from propellant tanks 225. The holding tank 113 may be pressurized by pressurant received from the pressurant tank 230 by way of a pressure regulator. FIG. 4 illustrates a simplified block diagram of a spacecraft, according to another implementation. In the illustrated example, a fluid flow metering arrangement 410 includes a holding tank 413 and a pressurant transfer tank 415, co-located with and thermally controlled, together, by an active thermal control arrangement 414. The illustrated implementation, advantageously, may mitigate thermal transients associated with pressurant expansion and compression.

Figure 5:
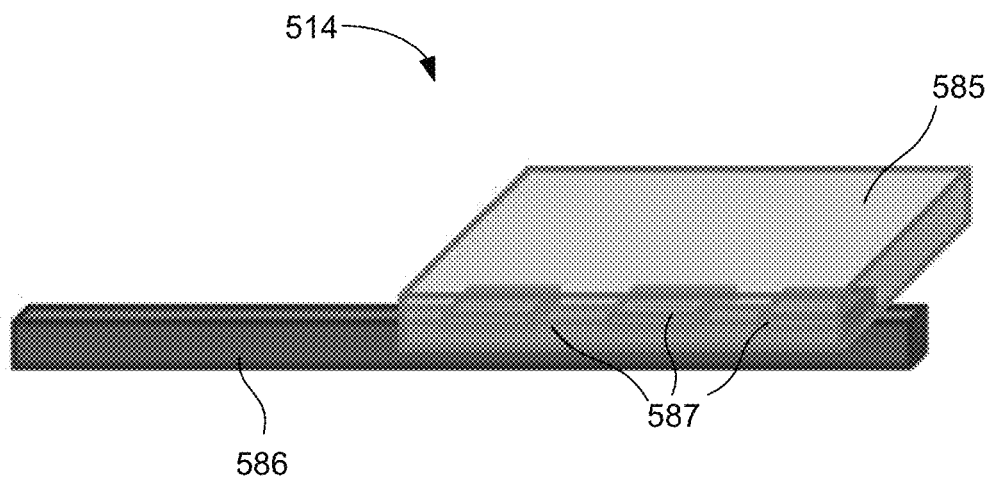
FIG. 5 illustrates selected features of an active thermal control arrangement, according to an implementation.

FIG. 5 illustrates selected features of an active thermal control arrangement, according to an implementation. In the illustrated example, an active thermal control arrangement 514 includes one or more thermoelectric coolers 587 disposed between and thermally coupled with a heat pipe 586 and a mounting plate 585. The thermoelectric coolers 587 may be configured to use the Peltier effect to create a temperature difference when a voltage difference is imposed across terminals of each thermoelectric device. Consequently, the thermoelectric cooler 587 may also be referred to herein as a Peltier device. The thermoelectric coolers 587 may be thermostatically controlled. As described in connection with FIG. 3, but omitted for clarity of illustration from FIG. 5, the active thermal control arrangement 514 may include a thermal insulation arrangement enclosing a flow meter and holding tank that are thermally coupled with the mounting plate 585. The active thermal control arrangement 514 may also include a heater, which may be thermostatically controlled, to provide, together with the thermoelectric coolers 587, active temperature control of the mounting plate 385, the flow meter 112 and the holding tank 113. Implementations of Peltier devices are described in U.S. Pat. No. 9,714,777, entitled "HEAT PIPE AND RADIATOR SYSTEM WITH THERMOELECTRIC COOLER", assigned to the assignee of the present disclosure and hereby incorporated by reference into the present disclosure in its entirety.

Figure 6:
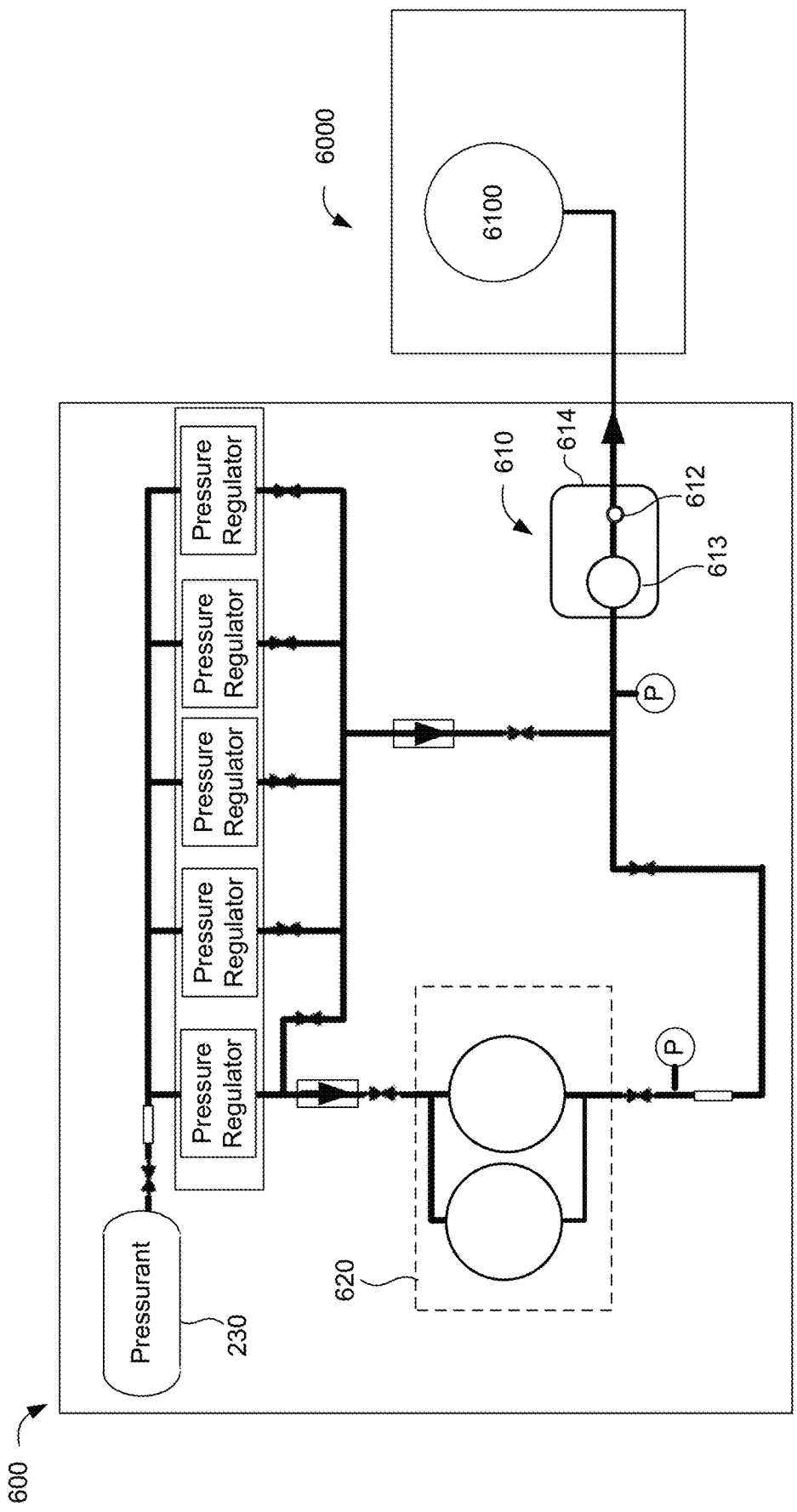
FIG. 6 illustrates simplified block diagrams of a first spacecraft and a second spacecraft, according to an implementation.

FIG. 6 illustrates simplified block diagrams of a first (servicing) spacecraft 600 and a second (client) spacecraft 6000, according to an implementation. The servicing spacecraft 600 includes a first fluid storage arrangement 620, that may include one or more tanks (in the illustrated implementation, two) for storing bulk quantities of propellant/pressurant. For example, the first fluid storage arrangement 620 may be configured to store 1000 liters or more of propellant/pressurant. The servicing spacecraft 600 also includes a flow metering arrangement 610 that includes a flow meter 612, and a holding tank 613. The holding tank 613, advantageously, is disposed proximate to the flow meter 612. The flow meter 612 and the holding tank 613 may be thermally controlled, together, by an active thermal control arrangement 614.

The client spacecraft 6000 may be serviced by the servicing spacecraft 600 by transferring propellant and or pressurant from the holding tank 613 through the flow meter 612 to a second fluid storage arrangement 6100 on-board the client spacecraft 120.

Figure 7:
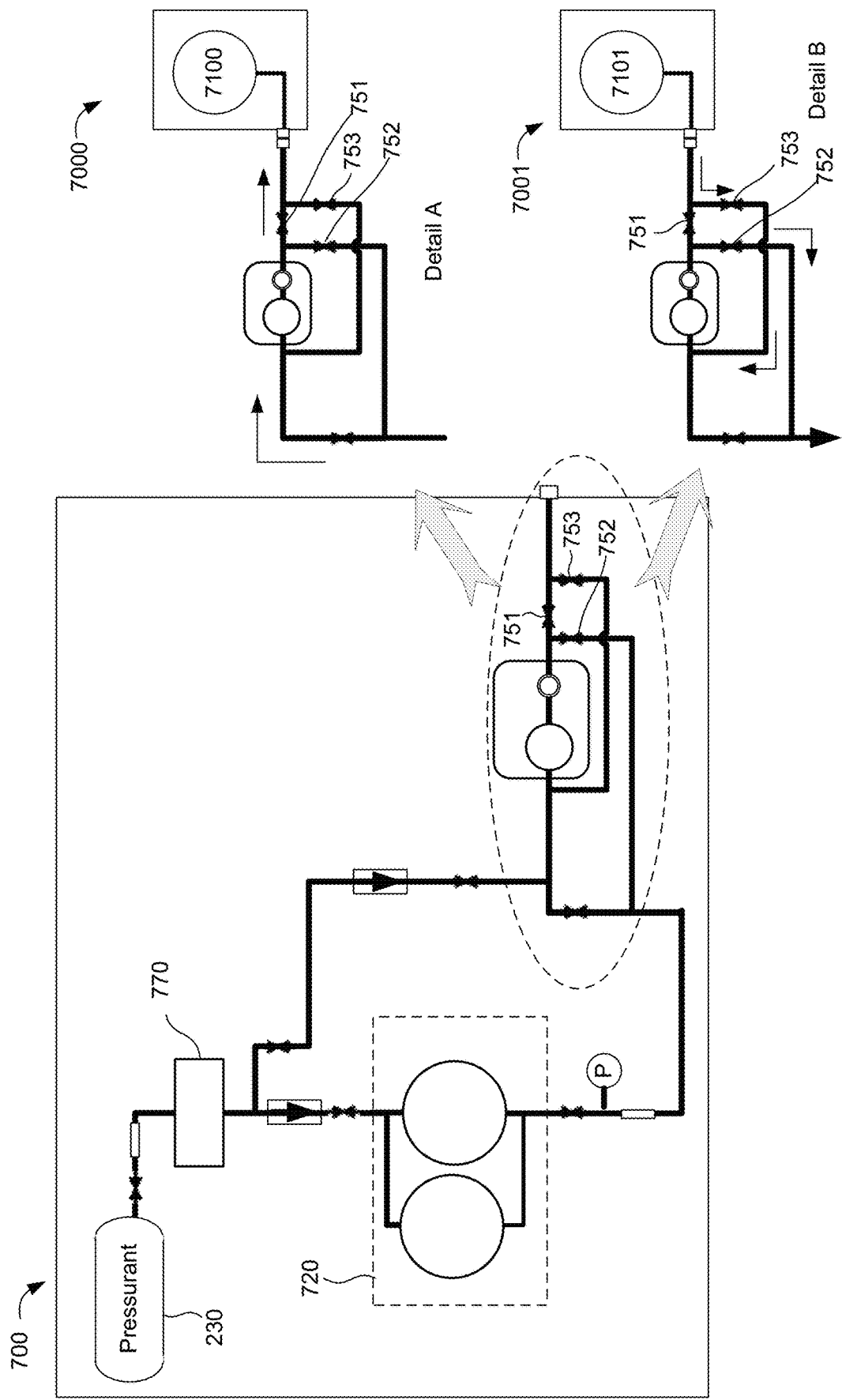
FIG. 7 illustrates simplified block diagrams of a first spacecraft, a second spacecraft, and a third spacecraft, according to an implementation.

FIG. 7 illustrates simplified block diagrams of a first (servicing) spacecraft 700, a second (client) spacecraft 7000, and a third (servicing) spacecraft 7001 according to an implementation. The first spacecraft 700 may be configured to service the second spacecraft 7000 and to receive service from the third spacecraft 7001. The servicing spacecraft 700 includes a first fluid storage arrangement 720 for storing bulk quantities of propellant/pressurant, a pressure regulation system 770 and a fluid flow metering arrangement 710. As described hereinabove, the flow metering arrangement 710 may include a flow meter and a holding tank disposed proximate to the flow meter 612, each being thermally controlled by an active thermal control arrangement. A direction of fluid flow through the flow metering arrangement 710 may be controlled by appropriate actuation of commandable valves 751, 752 and 753. For example, when the first spacecraft 700 is to be configured to service the second spacecraft 7000, including second fluid storage arrangement 7100, commandable valve 751 may be actuated to an open position, while commandable valves 752 and 753 may be actuated to a closed position. As a result, propellant may be transferred, in the direction indicated in Detail A, from the first fluid storage arrangement 720 to the holding tank, and from the holding tank, through the flow meter, to the second fluid storage arrangement 7100.

When the first spacecraft 700 is to be configured to receive service from the third spacecraft 7001, including third fluid storage arrangement 7101, commandable valve 751 may be actuated to a closed position, while commandable valves 752 and 753 may be actuated to an open position. As a result, propellant may be transferred, in the direction indicated in Detail B, from the third fluid storage arrangement 7101 to the holding tank, and from the holding tank, through the flow meter, to the first fluid storage arrangement 720.

Figure 8:
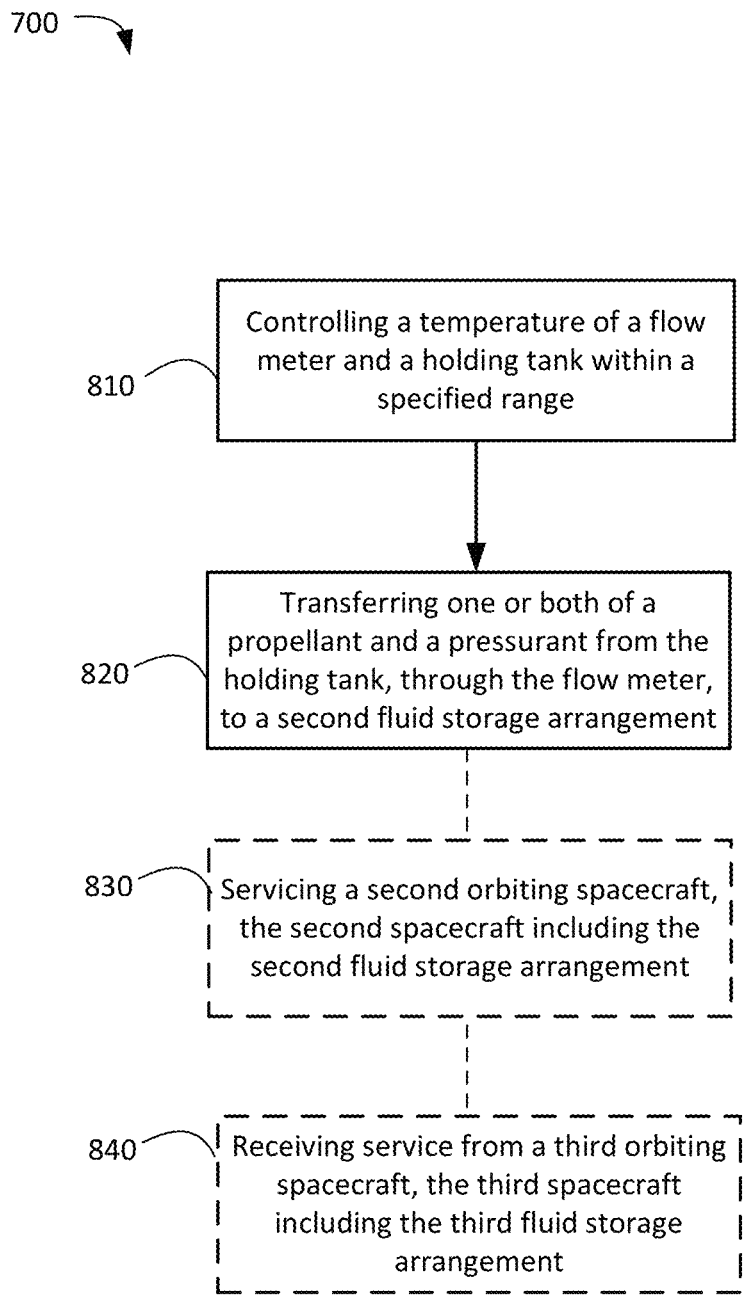
FIG. 8 illustrates a process flow diagram for operating a spacecraft, according to an implementation.

FIG. 8 illustrates a process flow diagram for operating a spacecraft. The spacecraft, as described hereinabove, may include a first fluid storage arrangement, a flow meter, a holding tank disposed proximate to the flow meter and an active thermal control arrangement. The method 800 may start, at block 810, with controlling a temperature of the flow meter and the holding tank within a specified range. At block 820, one or both of a propellant and a pressurant may be transferred from the holding tank, through the flow meter, to a second fluid storage arrangement. The active thermal control arrangement may include an isothermal mounting panel, one or more heat pipes and a thermostatically controlled heater. Optionally, the method 800 may include servicing, at block 830 a second orbiting spacecraft, the second spacecraft including the second fluid storage arrangement. Optionally, the method 800 may further include receiving, at block 840 service from a third orbiting spacecraft, the third spacecraft including a third fluid storage arrangement.

Figure 9:
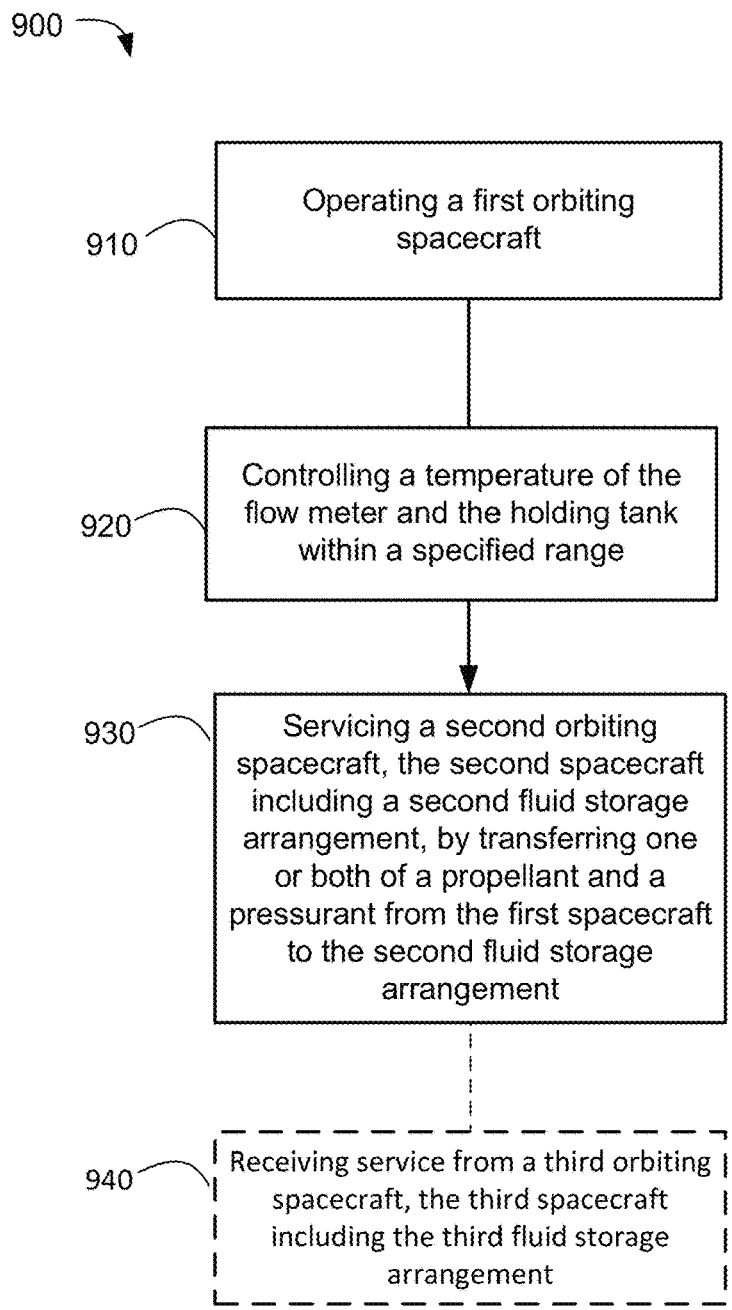
FIG. 9 illustrates a process flow diagram for servicing one spacecraft with another spacecraft, according to an implementation.

FIG. 9 illustrates a process flow diagram for servicing one spacecraft with another spacecraft. A first orbiting spacecraft, as described hereinabove, may include a first fluid storage arrangement, a flow meter, a holding tank disposed proximate to the flow meter and an active thermal control arrangement. The method 900 may start, at block 910, with operating the first orbiting spacecraft. At block 920, a temperature of the flow meter and the holding tank may be controlled within a specified range. At block 930, one or both of a propellant and a pressurant may be transferred from the holding tank, through the flow meter, to a second fluid storage arrangement of a second spacecraft. Optionally, the method 900 may include receiving, at block 940 service from a third orbiting spacecraft, the third spacecraft including a third fluid storage arrangement.

Thus, techniques for on-orbit propellant metering and refueling have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
a first spacecraft including:
a first fluid storage arrangement; and
a fluid flow metering arrangement, the fluid flow metering arrangement including:
a holding tank coupled with the first fluid storage arrangement,
a flow meter disposed proximate to the holding tank, and
an active thermal control arrangement; wherein
the first spacecraft is configured to service a second spacecraft, the second spacecraft including a second fluid storage arrangement, by transferring one or both of a propellant and a pressurant from the first fluid storage arrangement to the holding tank, and from the holding tank, through the flow meter, to the second fluid storage arrangement; and
at least during the transferring of the one or both of the propellant and the pressurant, the active thermal control arrangement maintains a temperature of the flow meter and the holding tank within a specified range.

2. The system of claim 1, wherein the first fluid storage arrangement includes at least one liquid propellant tank and at least one pressurant tank and the holding tank is selectably coupled with one or both of the liquid propellant tank and the pressurant tank.

3. The system of claim 1, wherein the active thermal control arrangement includes an isothermal mounting panel, one or more heat pipes and a thermostatically controlled heater.

4. The system of claim 1, wherein the first spacecraft includes a pressurant tank and a plurality of regulator modules are disposed in parallel between the pressurant tank and the holding tank, each regulator module including a pressure regulator and a control valve.

5. The system of claim 4, wherein the regulator modules are configured to deliver pressurant from the pressurant tank to the holding tank at a selectable regulated pressure.

6. The system of claim 4, wherein the plurality of regulator modules are includes one or both of an analog pressure regulator and a Bang-Bang pressure regulator.

7. The system of claim 1, wherein a measurement error of the flow meter, when temperature controlled within the specified range, is not greater than 1%.

8. The system of claim 1, wherein the active thermal control arrangement includes one or more thermoelectric coolers.

9. The system of claim 1, wherein the first spacecraft is configured to be serviced by a third spacecraft, the third spacecraft including a third fluid storage arrangement, by transferring one or both of a propellant and a pressurant from the third fluid storage arrangement to the holding tank, and from the holding tank, through the flow meter, to the first fluid storage arrangement.

10. A method comprising:
operating a first orbiting spacecraft, the first spacecraft including a first fluid storage arrangement, a flow meter, a holding tank disposed proximate to the flow meter and an active thermal control arrangement;
transferring one or both of a propellant and a pressurant from the holding tank, through the flow meter, to a second fluid storage arrangement; and
maintaining, at least during the transferring, with the active thermal control arrangement, a temperature of the flow meter and the holding tank within a specified range.

11. The method of claim 10, wherein the first fluid storage arrangement includes at least one liquid propellant tank and at least one pressurant tank and the holding tank is selectably coupled with one or both of the liquid propellant tank and the pressurant tank.

12. The method of claim 10, wherein the active thermal control arrangement includes an isothermal mounting panel, one or more heat pipes and a thermostatically controlled heater.

13. The method of claim 10, wherein a measurement error of the flow meter, when temperature controlled within the specified range is not greater than 1%.

14. The method of claim 10, further comprising servicing a second orbiting spacecraft, the second spacecraft including the second fluid storage arrangement.

15. The method of claim 14, further comprising receiving service from a third orbiting spacecraft, the third spacecraft including a third fluid storage arrangement, the service including transferring one or both of a propellant and a pressurant from the third fluid storage arrangement to the holding tank, and from the holding tank, through the flow meter, to the first fluid storage arrangement.

16. A method comprising:
operating a first orbiting spacecraft, the first spacecraft including a first fluid storage arrangement, a flow meter, a holding tank disposed proximate to the flow meter and an active thermal control arrangement;
servicing a second orbiting spacecraft, the second spacecraft including a second fluid storage arrangement, by transferring one or both of a propellant and a pressurant from the holding tank, through the flow meter, to the second fluid storage arrangement; and
maintaining, at least during the transferring, with the active thermal control arrangement, a temperature of the flow meter and the holding tank within a specified range.

17. The method of claim 16, wherein the first fluid storage arrangement includes at least one liquid propellant tank and at least one pressurant tank and the holding tank is selectably coupled with one or both of the liquid propellant tank and the pressurant tank.

18. The method of claim 16, wherein the active thermal control arrangement includes an isothermal mounting panel, one or more heat pipes and a thermostatically controlled heater.

19. The method of claim 16, further comprising receiving service from a third orbiting spacecraft, the third spacecraft including a third fluid storage arrangement, the service including transferring one or both of a propellant and a pressurant from the third fluid storage arrangement to the holding tank, and from the holding tank, through the flow meter, to the first fluid storage arrangement.

20. The method of claim 16, wherein a plurality of regulator modules and control valves are disposed in parallel between the first fluid storage arrangement and the holding tank, the regulator modules and control valves configured to deliver pressurant at a selectable regulated pressure.

\* \* \* \* \*